(12) United States Patent  (10) Patent No.: US 7,783,789 B2
Zhu et al.  (45) Date of Patent: Aug. 24, 2010

(54) APPARATUS WITH PROGRAMMABLE TOUCH SCREEN AND METHOD THEREOF

(75) Inventors: Jian-Guo Zhu, Shenzhen (CN); Tsung-Jen Chuang, Taipei Hsien (TW); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 387 days.

(21) Appl. No.: 11/779,288

(22) Filed: Jul. 18, 2007

(65) Prior Publication Data

US 2008/0052422 A1   Feb. 28, 2008

(30) Foreign Application Priority Data

Jul. 19, 2006   (CN) .................. 2006 1 0061703

(51) Int. Cl.
*G06F 3/00* (2006.01)
(52) U.S. Cl. .................. 710/8; 345/156; 345/173; 717/107
(58) Field of Classification Search .......... 710/14, 710/62, 8; 345/172, 173, 358; 717/107
See application file for complete search history.

(56) References Cited

U.S. PATENT DOCUMENTS

| | | | |
|---|---|---|---|
| 5,623,261 A * | 4/1997 | Rose | 341/26 |
| 6,154,210 A * | 11/2000 | Anderson | 715/840 |
| 6,181,344 B1 | 1/2001 | Tarpenning et al. | |
| 6,281,886 B1 * | 8/2001 | Ranieri | 345/173 |
| 7,263,661 B2 * | 8/2007 | Chavers et al. | 715/744 |
| 7,663,606 B2 * | 2/2010 | Mattice et al. | 345/173 |
| 2001/0035859 A1 * | 11/2001 | Kiser et al. | 345/173 |
| 2003/0090473 A1 * | 5/2003 | Joshi | 345/173 |
| 2004/0015828 A1 * | 1/2004 | MacKaie | 717/104 |
| 2005/0057531 A1 * | 3/2005 | Patino et al. | 345/174 |

* cited by examiner

*Primary Examiner*—Henry W. H. Tsai
*Assistant Examiner*—Elias Mamo
(74) *Attorney, Agent, or Firm*—Frank R. Niranjan

(57) ABSTRACT

A method for programming a touch screen of an apparatus is provided. The touch screen includes sensors for sensing locations of inputs and generating corresponding signals, and keys each of which consisting of a group of the sensors. The method includes: designing a group of the sensors as a key; setting an associated function to the designed key; generating a layout file of the designed keys; showing the layout file to prompt position and the associated function of each of the keys; acquiring the associated functions according to the key indicated by the signals; and executing the acquired functions.

2 Claims, 6 Drawing Sheets

APPARATUS WITH PROGRAMMABLE TOUCH SCREEN AND METHOD THEREOF

BACKGROUND

1. Technical Field

The present invention relates to an electronic apparatus, particularly to an electronic apparatus with a programmable touch screen and method for programming touch screen.

2. General Background

Touch screens are widely used in electronic devices, such as mobile phones, personal digital assistants (PDA), automated teller machines (ATM), etc. Users touch the displayed keys, e.g., numeric keys, character keys, and function keys, and the device will perform corresponding functions associated with the touched keys. But, size, shape, and position of the keys on the touch screen are pre-programmed by device manufacturers, that is, users cannot change the layout of the keys. These pre-programmed keys may not meet the needs or habits of each user.

What is needed, therefore, is an apparatus with a programmable touch screen and a method for programming the touch screen.

SUMMARY

An apparatus with a programmable touch screen is provided. The apparatus includes a touch screen for sensing locations of inputs and generating corresponding signals; a storage unit for storing a setting file which is configured for storing relationships among the sensors, keys and executable functions; a micro control unit (MCU), includes a key design module for receiving the signals, designing and storing the relationship between the keys and the sensors; a function setting module for setting and storing the relationship between the designed keys and the functions; an acquiring module configured for receiving signals, and acquiring the corresponding function from the setting file according to the keys indicated by the received signals; a layout generation module configured for generating a layout file of the designed keys according to the setting file, wherein the layout file includes a plurality of icons each of which corresponds to one of the designed keys; and an executing module configured for executing the acquired functions; and a display module for controlling the touch screen to display the designed keys according to the layout file.

A method for programming a touch screen is also provided. The touch screen includes sensors for sensing locations of operational inputs and generating corresponding signals, and keys each of which consisting of a group of the sensors. The method includes: designing a group of the sensors as a key; setting an associated function to the designed key; generating a layout file of the designed keys; showing the layout file to prompt position and the associated function of each of the keys; acquiring the associated functions according to the key indicated by the signals; and executing the acquired functions.

Other advantages and novel features will be drawn from the following detailed description with reference to the attached drawing.

DETAILED DESCRIPTION OF THE EMBODIMENT

Figure 1:
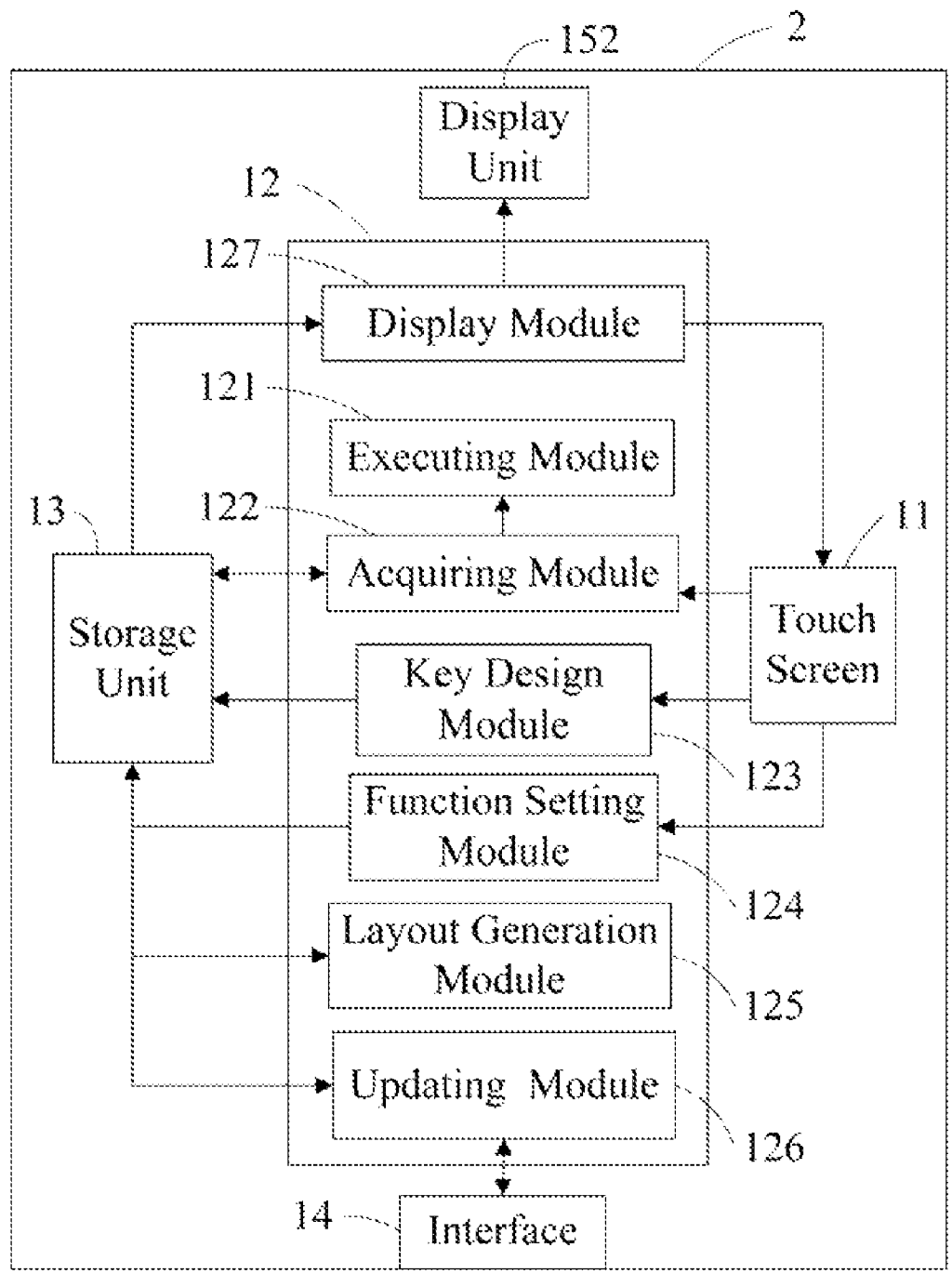
FIG. 1 is a block diagram of a hardware infrastructure of an apparatus with programmable touch screen.

FIG. 1 is a block diagram of a hardware infrastructure of an apparatus with a programmable touch screen in accordance with a preferred embodiment of the present invention. The apparatus 1 can be any electronic device that adopts a touch screen, e.g., a mobile phone, personal digital assistants (PDA), gaming devices, and automated teller machines (ATM). The apparatus 1 includes a touch screen 11, a micro controlling unit (MCU) 12, a storage unit 13, and an interface 14.

Figure 2:
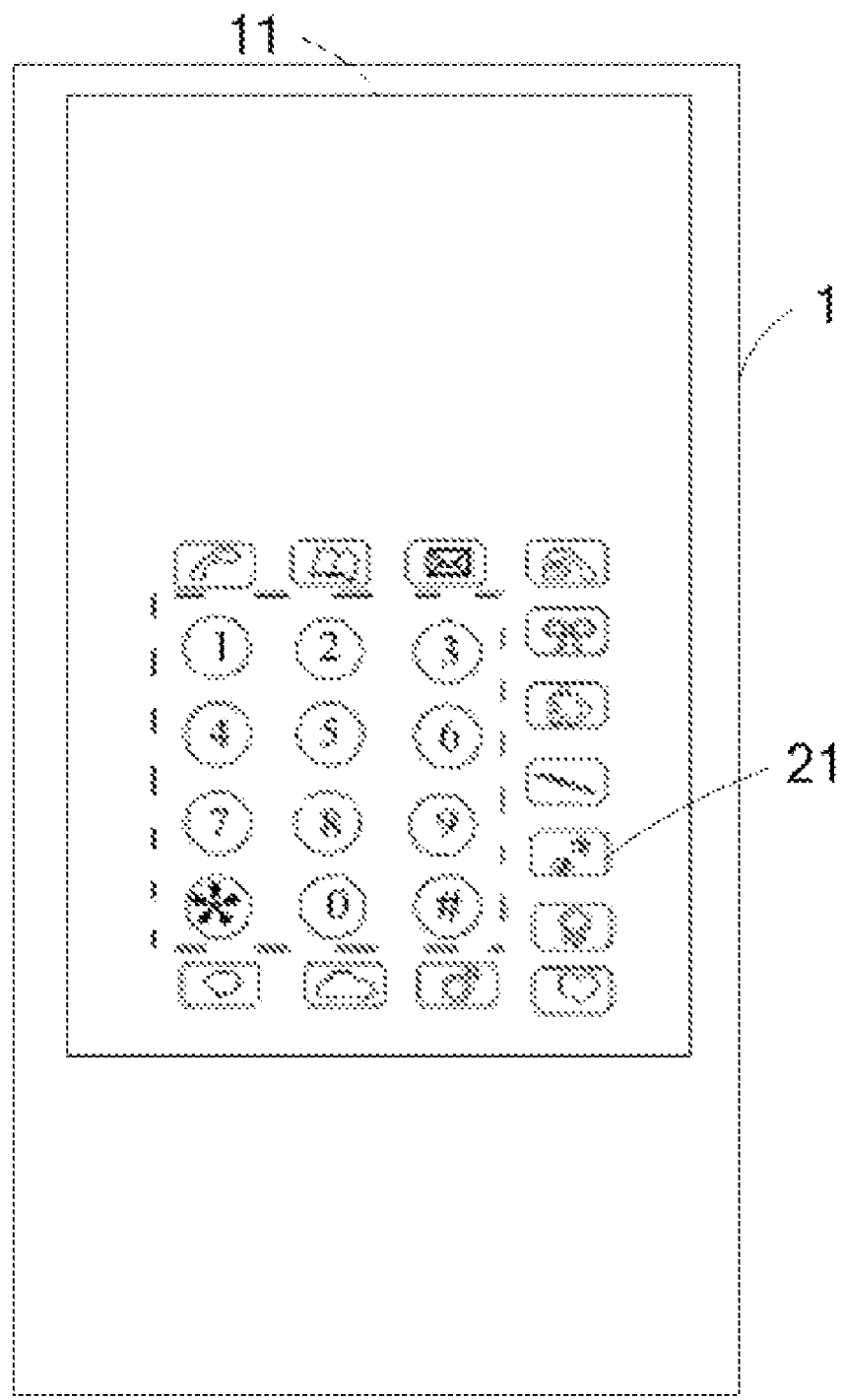
FIG. 2 is a schematic diagram of designed keys on the programmable touch screen of the apparatus of FIG. 1.

Referring to FIG. 2, the touch screen 11 is divided into a plurality of keys 21. Each of the keys 21 is assigned with a corresponding function, and includes a group of sensors (not shown) for generating corresponding signals to activate or perform the corresponding function in response to a contact thereon. Each sensor of the touch screen 11 is further assigned a coordinate for contact area identification.

The storage unit 13 (shown in FIG. 1) is configured for storing a setting file and a plurality of programs for executing functions associated with the keys 21. The setting file is configured for storing relationships among the sensors, the keys 21, and the functions. The MCU 12 includes an executing module 121, an acquiring module 122, a key design module 123, a function setting module 124, a layout generation module 125, and an updating module 126. The apparatus 1 has a plurality of operation modes, including but not limited to, a key design mode, a function setting mode, and a normal mode.

Figure 3:
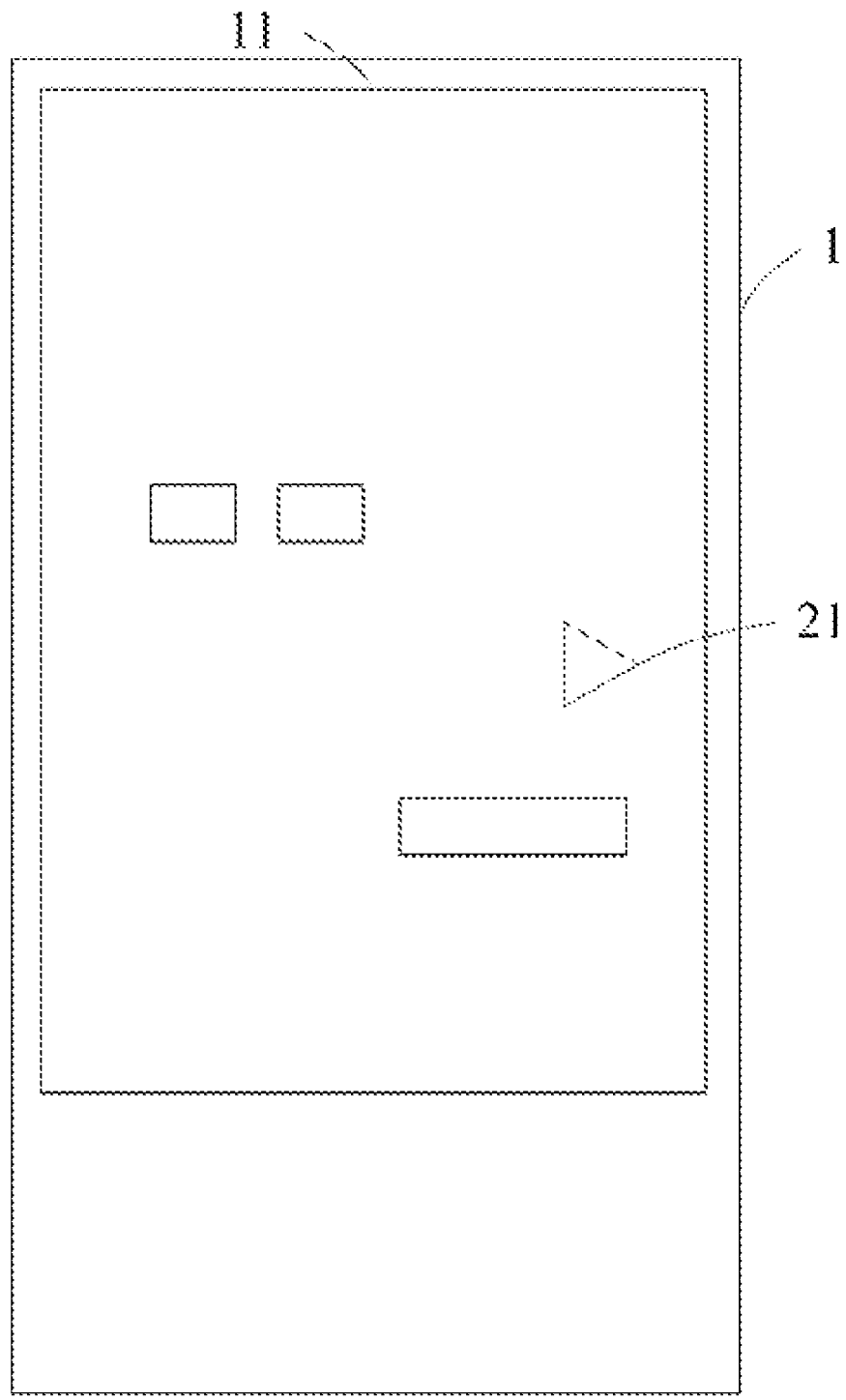
FIG. 3 is a schematic diagram of an appearance of the apparatus of FIG. 1 in a key design mode.
Figure 4:
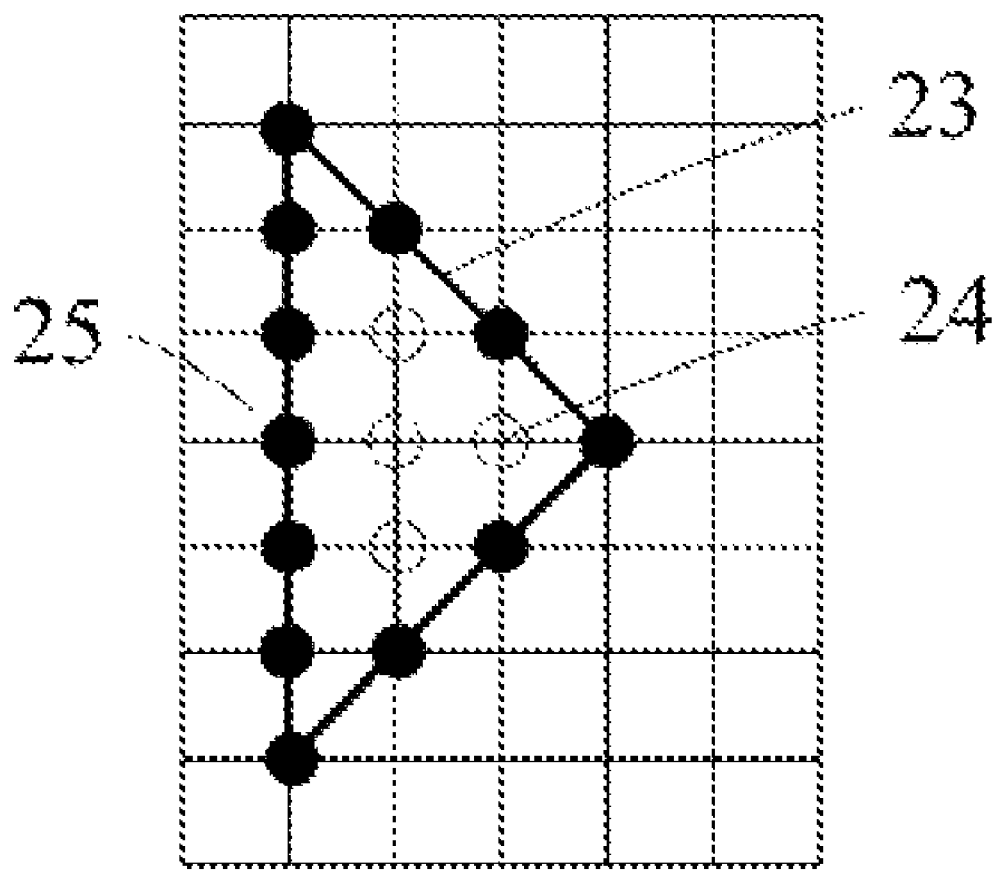
FIG. 4 is a schematic diagram of part of the programmable touch screen of the apparatus of FIG. 1.

In the key design mode, the key design module 123 is configured for designing and recording the relationship between the sensors and the keys 21. Users can design particular size, shape, and position of the keys 21 on the touch screen 11 as they like (see FIG. 3). While receives the signals generated by the sensors on the touch screen 11, the key design module 123 identifies the contact area according to the associated coordinates, and controls the touch screen 11 to display a contact track. Therefore, users can view arrangement of the designed keys 21. Referring to FIG. 4, the contact track is preferably a closed line 23, the sensors in the closed line region (e.g., white sensors 24) and on the closed line (e.g., black sensors 25) are all programmed as a key 21.

Figure 5:
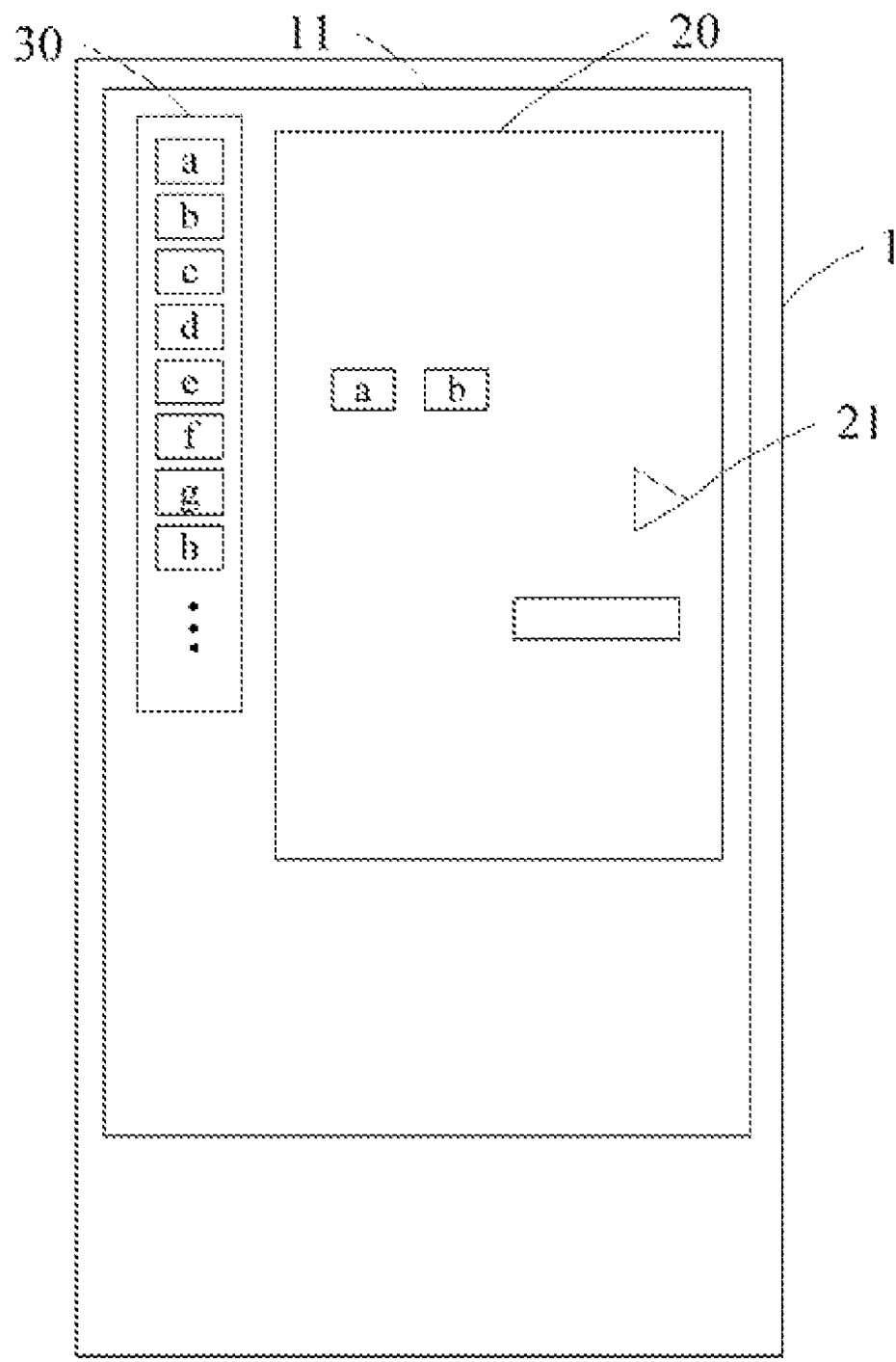
FIG. 5 is a schematic diagram of an appearance of the apparatus of FIG. 1 in a function setting mode.

While the operation of designing the keys 21 on the touch screen 11 is finished, the apparatus 1 is switched to the function setting mode for function setting operations. In the function setting mode, the touch screen 11 displays a GUI (graphic user interface) which includes a virtual touch screen 20 and a function selection area 30 (see FIG. 5). The virtual touch screen 20 has a same shape as well as the touch screen 11. The function selection area 30 lists a plurality of selectable executable functions of the apparatus 1. Users can select a desired function from the function selection area 30, and assign the selected function to the key 21, thereby setting a relationship between the key 21 and the associated function. The function setting module 124 records the relationship between the key 21 and the associated function in the setting file.

While the operation of setting the associated functions is finished, the layout generation module 125 (see FIG. 1) generates a layout file (e.g., an image file) of the designed keys 21 according to the setting file. The layout file includes a plurality of icons whose arrangement are the same as the designed keys 21. In other words, each of the icons in the layout file corresponds to one of the keys 21, and further has a graphical label for indicating the function associated with the corresponding key 21. The graphical label can be a word, a symbol, a sign, a figure, a photo, a number, an indicator, or any combination of them.

In the normal mode, the display module 127 controls the touch screen 11 to display the designed keys 21 according to the layout file. Each of the designed keys 21 is regarded as a function key. When receiving the signals generated by the sensors from the touch screen 11 in the normal mode, the acquiring module 122 identifies the key 21 according to the associated coordinates of the signals, and acquires the corresponding function from the setting file according to the identified key 21. The executing module 121 is configured for executing the acquired function.

The interface 14 is configured for connecting to an external medium (not shown), such as a computer or another apparatus similar to apparatus 1. The interface 14 can be either wired interface or wireless interface. While connecting with the external medium, the updating module 126 updates the setting file from the external medium.

Figure 6:
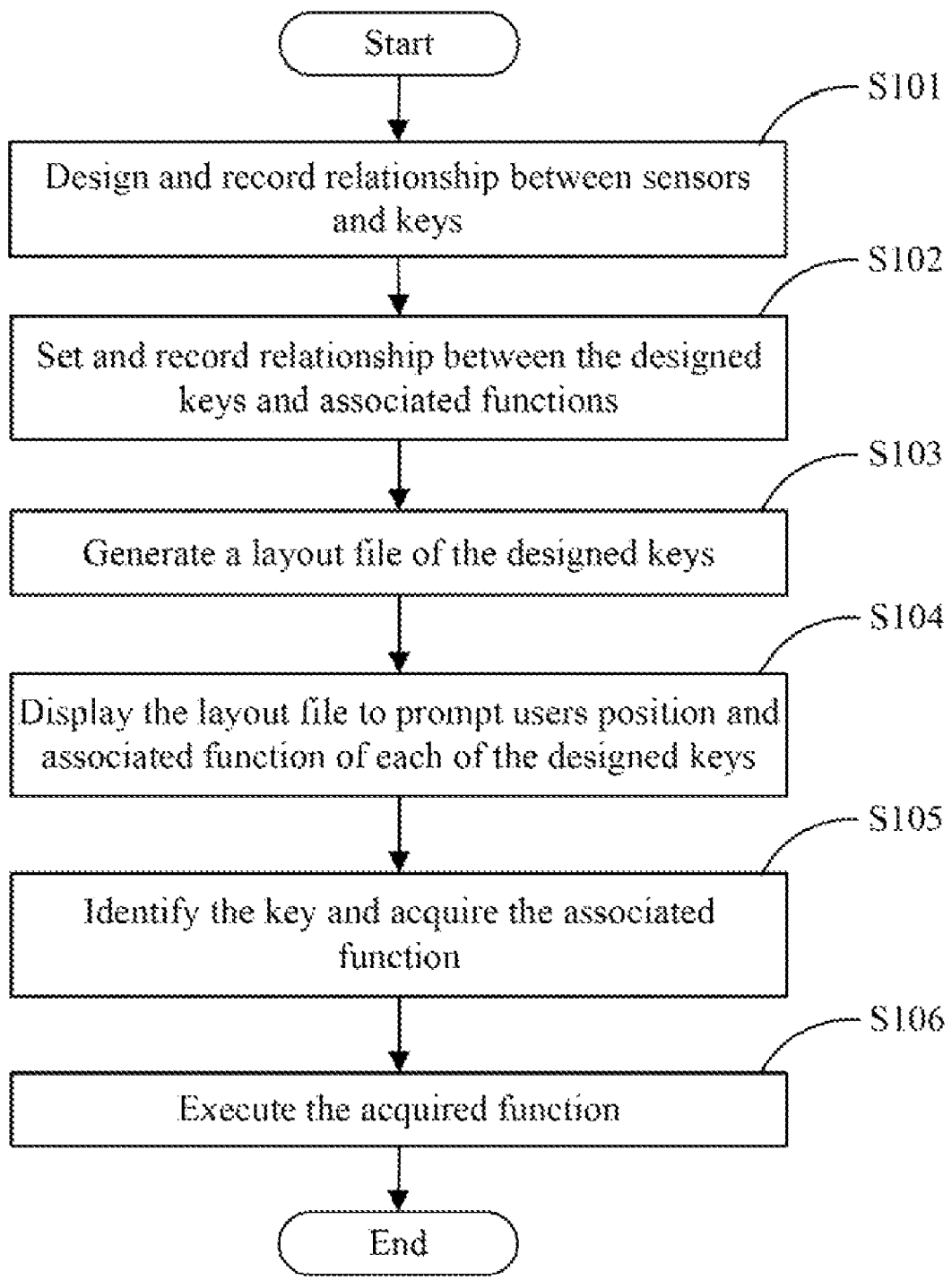
FIG. 6 is a flowchart of a preferred method for programming a touch screen.

FIG. 6 is a flowchart of a method for programming touch screen of an apparatus which is performed by the apparatus of FIG. 1.

In step S101, the key design module 123 receives the signals generated by the sensors, designs and records the relationship between the key 21 and the sensors, in the key design mode.

In step S102, the function setting module 124 sets and records the relationship between the designed keys 21 and the associated functions, in the function setting mode.

In step S103, the layout generation module 125 generates the layout file of the designed keys 21 according to the setting file.

In step S104, the display module 127 controls the touch screen 11 to display the designed keys 21 according to the layout file to prompt users the position and the associated function of each of the designed keys 21.

In step S105, the acquiring module 122 receives signals generated by the sensors, identifies the key 21 according to the associated coordinates of the signals, and acquires the associated function from the setting file according to the identified key 21.

In step S106, the executing module 121 executes the acquired function.

Therefore, by utilizing the apparatus 1, size, shape, and position of the keys and the corresponding functions on the touch screen 11 can be optionally designed according to users' preferences, thereby providing a relatively more friendly operation interface to users.

Although the present invention has been specifically described on the basis of preferred embodiments and preferred methods thereof, the invention is not to be construed as being limited thereto. Various changes or modifications may be made to the embodiment and method without departing from the scope and spirit of the invention.

What is claimed is:

1. An apparatus with a programmable touch screen, comprising:

a touch screen comprising a plurality of sensors and a plurality of keys, wherein the sensors are configured for detecting locations of operational inputs and generating corresponding signals, and each of the keys consists of a group of the sensors, each sensor of the touch screen is assigned a coordinate;

a storage unit configured for storing a plurality of programs and a setting file, wherein the programs are configured for executing functions on the apparatus, and the setting file is configured for storing relationships among the sensors, the keys and the functions;

a micro control unit (MCU), comprising:

a key design module configured for receiving the signals, design the sensors indicated by the received signals as one of the keys, identifying a contact area according to the associated coordinates, and controlling the touch screen to display a contact track to view arrangement of the designed key, and storing the relationship between the designed key and the sensors indicated by the signals into the setting file, wherein the contact track is a closed line, the sensors in the closed line region and on the closed line are all programmed as one key;

a function setting module configured for setting one of the functions to the designed key, and storing the relationship between the designed key and the corresponding function into the setting file;

an acquiring module configured for receiving the signals, and acquiring the corresponding function from the setting file according to the key indicated by the received signals;

a layout generation module configured for generating a layout file of the designed keys according to the setting file, wherein the layout file includes a plurality of icons each of which corresponds to one of the designed keys;

an executing module configured for executing the acquired corresponding functions; and a display module configured for controlling the touch screen to display the designed keys according to the layout file.

2. A method for programming a touch screen of an apparatus, wherein the touch screen comprises a plurality of sensors configured for sensing locations of operational inputs and generating corresponding signals, and a plurality of keys each of which consisting of a group of the sensors, each sensor of the touch screen is assigned a coordinate, the method comprising:

receiving the signals generated by the touch screen;

designing the sensors indicated by the received signals as one of the keys;

identifying a contact area according to associated coordinates;

controlling the touch screen to display a contact track to view arrangement of the designed key, wherein the contact track is a closed line, the sensors in the closed line region and on the closed line are all programmed as one key;

setting an associated function to the designed key;

generating a layout file of the designed keys, wherein the layout file comprises a plurality of icons each of which corresponds to one of the designed keys;

displaying the layout file in the touch screen to prompt position and the associated function of each of the keys;

acquiring the associated functions according to the key indicated by the signals; and executing the acquired associated functions.

* * * * *